United States Patent

[11] 3,616,360

| [72] | Inventors | Robert E. A. Dear;<br>Everett E. Gilbert, both of Morris<br>Township, Morris County, N.J. |
|------|-----------|---|
| [21] | Appl. No. | 826,127 |
| [22] | Filed | May 20, 1969 |
| [45] | Patented | Oct. 26, 1971 |
| [73] | Assignee | Allied Chemical Corporation<br>New York, N.Y. |

[54] PROCESS FOR PREPARING 2-CHLOROMETHYL-1,3-POLYFLUORO-2-PROPANOLS
6 Claims, 2 Drawing Figs.

| [52] | U.S. Cl. | 204/158 HA,<br>260/601, 424/343 |
|------|----------|---|
| [51] | Int. Cl. | B01j 1/10 |
| [50] | Field of Search | 204/158 HA |

[56] References Cited
UNITED STATES PATENTS

| 2,443,183 | 6/1948 | Cass | 260/601 |
| 3,037,059 | 5/1962 | Kaiser | 260/633 |
| 3,054,739 | 9/1962 | Reicheneder et al. | 204/158 |

Primary Examiner—John H. Mack
Assistant Examiner—Neil A. Kaplan
Attorney—Ernest A. Polin ABSTRACT: Preparation of 2-chloromethyl-1,3-polyfluoro-2-propanols by subjecting a mixture of a 2-methyl-1,3-polyfluoro-2-propanol, or a 2-(mono or dichloromethyl)-1,3-polyfluoro-2-propanol and chlorine to the action of a broadband of ultraviolet light in the wavelength range between about 2,000° A. and about 3,600° A. at a temperature between about 10° C. and about 200° C. The resulting compounds and their fluorinated derivatives are useful as fumigants against insects.

PATENTED OCT 26 1971 3,616,360

INVENTORS
ROBERT E. A. DEAR
EVERETT E. GILBERT
BY
Elizabeth Hunter
ATTORNEY

PROCESS FOR PREPARING 2-CHLOROMETHYL-1,3-POLYFLUORO-2-PROPANOLS

PROCESS FOR PREPARING 2-CHLOROMETHYL-1,3-POLYFLUORO-2-PROPANOLS

This invention relates to a new method for preparing 2-chloromethyl-1,3-polyfluoro-2-propanols and more specifically to a new method for preparing 2-trichloromethyl-1,1,1,3,3,3-hexafluoro-2-propanol.

In the past 2-trichloromethyl-1,1,1,3,3,3-hexafluoro-2-propanol of the formula

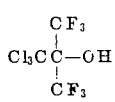

has been prepared by reacting hexafluoroacetone and trichloromethyl lithium in a medium of tetrahydrofuran at temperatures not above about −100° C. This prior art process has been used only on a small laboratory scale, and is obviously unsuited for large-scale commercial practice for the following reasons:

1. The exceedingly low temperature required would necessitate very expensive equipment to maintain the frigid reaction conditions.
2. Trichloromethyl lithium is stable only at −100° C. and below, and only in tetrahydrofuran solvent. Attempts to prepare this reagent in other solvents have been unsuccessful.
3. The instability of the trichloromethyl lithium to heat and moisture makes it necessary to prepare the reaction equipment with great care, including exhaustive drying to remove water. It is also necessary to purge with inert gas to ensure absence of carbon dioxide which, if present, would react preferentially with the trichloromethyl lithium.
4. Finally, the product of the prior art process is produced in the form of a stable complex of 2-trichloromethyl-1,1,1,3,3,3-hexafluoro-2-propanol and tetrahydrofuran which can be broken only by application of a strong acid such as hot concentrated sulfuric acid which adds a further troublesome and expensive step to the prior process.

It has been proposed to chlorinate tertiary butyl alcohol (2-methyl-2-propanol) by heating the alcohol with chlorine in the presence of an alkaline compound such as chalk, whereby mono, di and triclorotertiary butyl alcohols are produced. When this technique is applied to hexafluorotertiary butyl alcohol (2-methyl-1,1,1,3,3,3hexafluoro-2-propanol or to tetrafluorodichlorotertiary butyl alcohol (2-methyl-1,1,1,3,3-tetrafluoro-1,3-dichloro-2-propanol), no reaction whatever appears to take place, and no chlorine substitution occurs.

It is an object of the present invention to provide a simple and inexpensive process, adapted for commercial use, for preparing 2-chloromethyl-1,3-polyfluoro-2-propanols and especially 2-trichloromethyl-1,1,1,3,3,3-hexafluoro-2-propanol.

These and other objects are accomplished according to our invention wherein a mixture of a 2-methyl-1,3-polyfluoru-2-propanol or a 2-mono- or dichloromethyl-2-propanol and elemental chlorine are subjected to the action of a broadband of ultraviolet light in the wavelength range between about 2,000° A. and about 3,600° A. at a temperature of between about 10° C. and about 200° C.

The reaction according to our invention proceeds as follows:

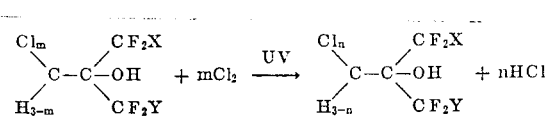

wherein $m$ is an integer from 0 to 2 inclusive, $n$ is an integer from 1 to 3 inclusive and X and Y are the same or different members of the group consisting of fluorine and chlorine.

Specific 2-methyl-1,3-polyfluoro-2-propanols usable as starting materials in our process include the following:

I. 2-methyl-1,1,1,3,3,3-hexafluoro-2-propanol of the formula

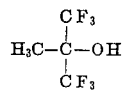

II. 2-monochloromethyl-1,1,1,3,3,3-hexafluoro-2propanol of the formula

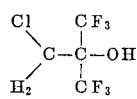

III. 2-dichloromethyl-1,1,1,3,3,3-hexafluoro-2-propanol of the formula

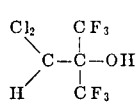

IV. 2-methyl-1,1,3,3,3-pentafluoro-1-chloro-2-propanol of the formula

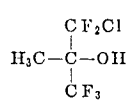

and the 2-monochloromethyl and 2-dichloromethyl derivatives of the above compound.

V. 2-methyl-1,1,3,3-tetrafluoro-1,3-dichloro-2-propanol of the formula

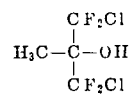

and the 2-monochloromethyl and 2-dichloromethyl derivatives of the above compound.

From the starting alcohols containing three hydrogens in the 2-methyl group, chlorination can be carried out so as to replace one, two or three hydrogens in the —CH₃ group by chlorine and the lower chlorinated compounds can either be recovered as such or used to carry out further chlorination. Accordingly, the compounds produced according to our invention include those of the general formula shown below

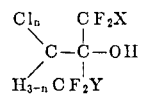

wherein $n$ is an integer from 1 to 3, X and Y are the same or different members of the group consisting of fluorine and chlorine.

When three chlorines are to be introduced, the overall process according to our invention proceeds as follows

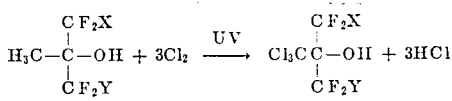

The process of our invention can be carried out either in the liquid phase or in the vapor phase as long as the indicated irradiation is provided and the reactants are maintained at the indicated reaction temperatures. We prefer however, to carry out the chlorination in the liquid phase, particularly when the desired end product is the trichlorinated alcohol, since more rapid and complete conversions are obtained by this method. When intermediate mono- and di-chlorinated products are to be recovered as end products, vapor phase reaction is preferred.

The process of our invention can be carried out either batchwise or continuously and appropriate apparatus is readily available for carrying out our photochemical reaction in either manner using immersion-type ultraviolet sources.

In carrying out the process, the 2-methyl-1,3-polyfluoro-2-propanol starting alcohol is mixed with elemental chlorine and the resulting mixture is irradiated at temperatures between about 10° C. and about 200° C. with a broadband of ultraviolet light in the wavelength range between about 2,000° A. and about 3,600° A.

The ultraviolet light can be supplied in any desired manner. For example, if the reaction vessel is of ultraviolet light-transparent material such as quartz, the UV source can be positioned outside the vessel. Preferably, the ultraviolet light source is positioned inside the reaction vessel, for example, encased in a water-cooled quartz well or other conventional device for supplying ultraviolet irradiation.

When operating batchwise in the liquid phase, the starting alcohols, which are all liquids at ordinary room temperatures (ca. 20–25° C.), are placed in a reaction vessel, and chlorine is introduced into the liquid as by bubbling chlorine gas through the liquid while irradiating the mixture with ultraviolet light in the indicated wavelength range.

If the process is to be carried out continuously in the liquid phase, this can be accomplished by passing the chlorine/alcohol mixture through a conventional irradiation apparatus, for example a falling film-type reactor wherein the liquid mixture to be irradiated is fed into an elongated glass tube onto the top of a rotating disc which whirls the liquid to the walls of the tube. The film of liquid thus formed falls down the inner walls of the tube, passing vertically past an ultraviolet irradiation lamp, suitably positioned vertically within the tube. The irradiated liquid is lead out of the bottom of the reactor tube and is either collected if reaction is complete, or is recirculated one or more times if necessary to complete the chlorination reaction.

When employing vapor phase chlorination, a mixture of chlorine gas and vaporized 2-methyl-1,3-polyfluoro-2-propanol is irradiated with ultraviolet light of the indicated wavelengths either in a continuous reactor through which the mixture is passed, or in a batch reactor in which the mixture is maintained in an irradiated zone at a temperature above the boiling point of the 2-methyl-1,3-polyfluoro-2-propanol, i.e., sufficiently high to maintain the reactants in the vapor state. Byproduct Byproducts hydrogen chloride which forms during the course of the chlorination reaction is inert to both reactants and reaction products and, due to its high volatility, can readily be separated from the reaction mass either continuously during the course of the reaction or by distillation after its completion.

Figure 1:
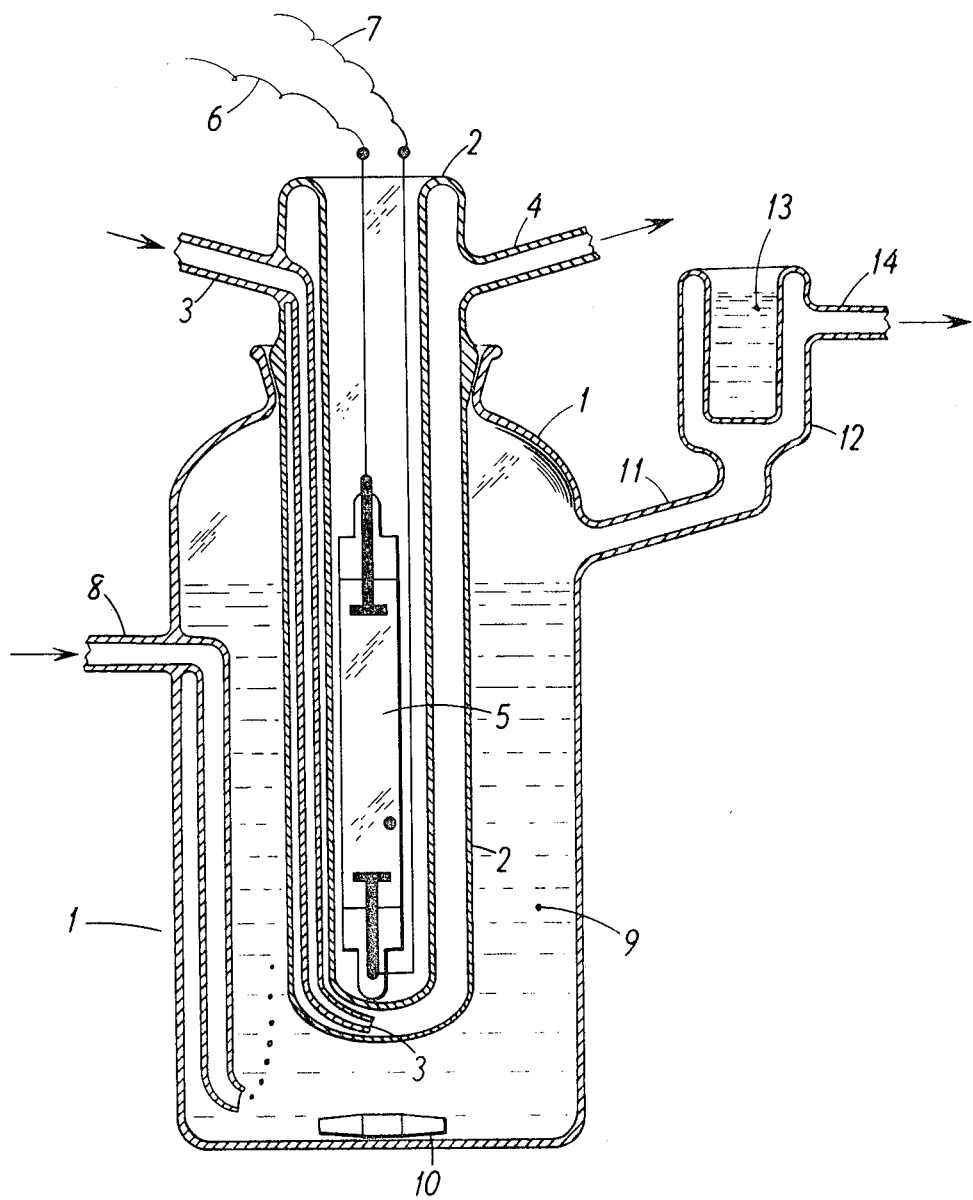
FIG. 1 depicts in half-section an apparatus suitable for carrying out our process batchwise in the liquid phase.
Figure 2:
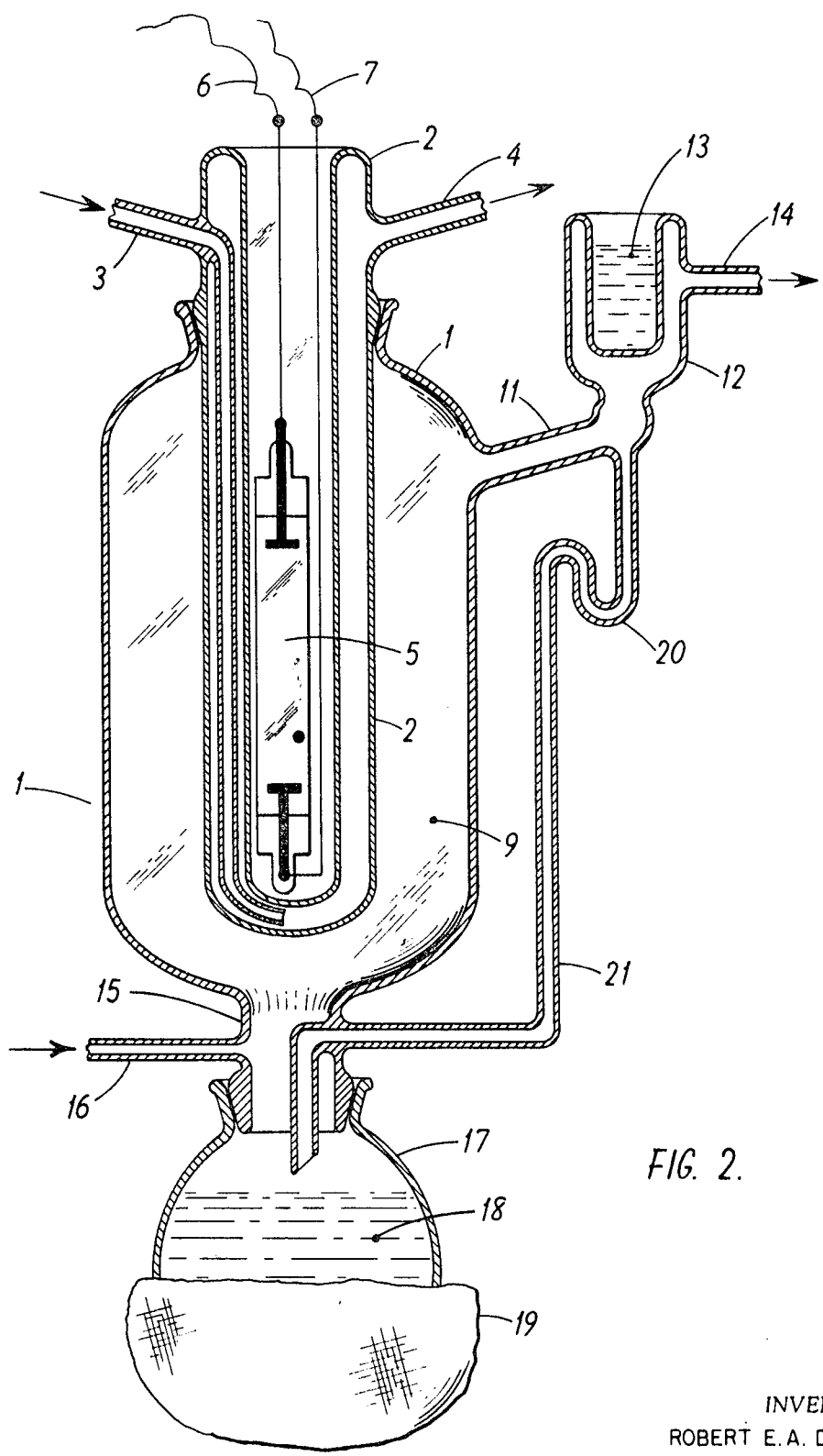
FIG. 2 shows also in half-section a modification of FIG. 1 adapted for carrying out our process batchwise in the vapor phase.

In exemplary chlorination procedures which are suitable for batch chlorination, we may utilize the apparatus shown in FIGS. 1 and 2 of the drawings.

Referring to the drawings, in FIG. 1, numeral 1 represents a liquid phase batch reactor. Numeral 2 represents a water-cooled quartz well within the reactor, equipped with liquid coolant inlet at 3 and a liquid outlet at 4. Positioned within the liquid-cooled well 2 is ultraviolet lamp 5 with electrical terminals 6 and 7, connected respectively to the ends thereof and to a source of electrical current (not shown). Inserted in the top half of the reactor 1 is gas inlet 8, extending into reaction zone 9 into the vicinity of magnetic stirrer 10 located near the bottom of reactor 1. Vapor exit 11 is provided near the top of the reactor, above the level of reacting liquid, said exit being connected to cold trap 12 containing dry ice 13 and equipped with vapor exit 14. Excess chlorine is condensed in trap 12 and returned to the reaction chamber, byproduct HCl exits through line 14.

FIG. 2 depicts a modification of FIG. 1 suitable for use in carrying out the reaction in the vapor phase. This modification is similar to that of FIG. 1 in all respects except that provision is made for vaporization of the reacting liquid, its admixture with gaseous chlorine, and the introduction of the gaseous mixture into the reaction vessel 1. Thus like numbers in FIG. 2 denote parts substantially identical to those of the same numbers in FIG. 1. In addition, the apparatus of FIG. 2 is equipped with neck 15 at the bottom provided with gas inlet 16 located at about the midpoint of said neck. Removably attached to the end of reactor neck 15 is vaporizing vessel 17, shown partially filled with liquid reactant 18 and equipped with heating mantle 19. The trap 13 in this modification is connected by line 21 having surge elbow 20 to provide return of condensed reactant or reaction product to the vaporization vessel.

In liquid phase operation a liquid 2-methyl-1,3-polyfluoro-2-propanol is charged to reaction vessel 1, and ultraviolet lamp 5 in quartz well 2 is lowered into the liquid alcohol. While maintaining the alcohol at the desired temperature by circulation of cooling water through well 2, stirrer 10 is actuated and gaseous chlorine is introduced through inlet 8, at approximately the rate at which it is absorbed by the liquid alcohol. The reaction can be monitored, if desired, by taking periodic samples and analyzing them, as by gas liquid chromatography, for chlorine content of the product, hence for progress of the chlorination. When conversion to the desired chlorination product is complete, usually in not more that about 24hours, chlorine feed is discontinued, the UV light source is discontinued or removed and the product is recovered. If desired, the product can be distilled to separate mono-, di- and tri-chlorinated products if all are present.

In vapor phase operation, a liquid 2-methyl-1,3-polyfluoro-2-propanol is placed in vaporizing vessel 17 and is heated as by heating mantle 19 to above its boiling point to vaporize the alcohol, causing the vapor to fill reaction zone 9 of reactor 1. Lamp 5 is turned on, and cooling water is circulated through well 2 entering at 3 and exiting at 4. Then chlorine gas is introduced into the reactor at 16 and is carried upward into vapor reactor 1 where it mixes with vaporized 2-methyl-1,3-polyfluoro-2-propanol, and both are irradiated with ultraviolet light from lamp 5 passing through UV-transparent well 2. Reaction takes place under the influence of the UV light. Portions of the vapor coming in contact with the cooled well 2 are condensed and return as liquid to vaporizing vessel 17 where they are revaporized and again circulate through the vapor phase reactor 1 for further contact and reaction with chlorine. This continuous vaporization-condensation cycle provides circulation of alcohol reactant which ensures continuing contact with the light-activated chlorine. Byproduct HCl (b.p. −83.7° C.) continuously flows through vapor exit 11 and is carried through cold trap 12 filled with dry ice 13 (−78° C.) and exits through line 14. Any occluded alcohol is condensed in trap 12 and is returned to the vaporizing vessel through surge elbow 20 and line 21.

Amount or intensity of irradiation is not unduly critical, as long as the required broad band of wavelengths between about 2,000° A. and about 3,600° A. is provided. Greater intensity of irradiation or the provision of a plurality of lamps will tend to shorten the time for completion of the chlorination somewhat, but does not appreciably influence the quality of the overall conversion.

Rate of chlorination under the influence of the ultraviolet light is relatively rapid, and depends on the area of the alcohol irradiated, the manner of carrying out the reaction and the degree of chlorination desired. In continuous operation wherein a thin moving stream of chlorine-alcohol mixture is subjected to the ultraviolet irradiations, residence times of a few seconds, e.g., about 5 seconds, are sufficient to provide an appreciable yield of chlorinated products. Complete chlorination to the trichlorinated product requires a somewhat longer exposure, for example at least about 10 seconds. In general irradiation is carried out for a period sufficient to provide at least substantial monochlorination, preferably a period between about 5 seconds and about 24 hours and preferably long enough to provide substantial trichlorination of the 2-methyl group.

The amount of chlorine used will be at least that stoichiometrically required to produce the desired chlorinated end product. An excess of chlorine does no harm and is readily recoverable. Rate of chlorine feed to the mixture will usually be at the rate the chlorine reacts with the alcohol under the conditions of the particular run.

Individual compounds which can be prepared according to the process of our invention include the following:

VI. 2-trichloromethyl-1,1,1,3,3,3-hexafluoro-2-propanol
VII. 2-dichlormethyl-1,1,1,3,3,3-hexafluoro-2-propanol
VIII. 2-monochloromethyl-1,1,1,3,3,3-hexafluoro-2-propanol
IX. 2-trichloromethyl-1,1,3,3-tetrafluoro-1,3-dichloro-2-propanol
X. 2-dichloromethyl-1,1,3,3-tetrafluoro-1,3-dichloro-2-propanol
XI. 2-monochloromethyl-1,1,3,3-tetrafluoro-1,3-dichloro-2-propanol
XII. 2-trichloromethyl-1,1,1,3,3-pentafluoro-1-monochloro-2-propanol
XIII. 2-dichloromethyl-1,1,1,3,3-pentafluoro-1-monochloro-2-propanol
XIV. 2-monochloromethyl-1,1,1,3,3-pentafluoro-1-monochloro-2-propanol Temperature of irradiation should be at least about 10° C., since at lower temperatures chlorine substitution is extremely slow and, moreover, the starting alcohol may freeze. On the other hand, temperatures in excess of about 200° C. tend to cause decomposition of the chlorinated reaction products. Reaction temperatures therefore will be between about 10° C. and about 200° C., preferably between about 50° C. and about 150° C. If carried out in the liquid phase, the reaction temperature will preferably be below the atmospheric boiling points of the starting materials. If carried out in the vapor phase, reaction temperatures will be above the boiling points of the reactants.

Approximate boiling points of the starting alcohols and corresponding trichlorinated products are shown in table I below.

TABLE I

Approximate boiling points of starting and product alcohols of formula

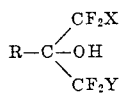

| | Value of— | | Boiling point, °C. |
|---|---|---|---|
| R | X | Y | |
| CH₃ | F | F | 61 |
| CCl H₂ | F | F | 89 |
| CCl₂H | F | F | 115 |
| CCl₃ | F | F | 135 |
| CH₃ | F | Cl | 89 |
| CCl₃ | F | Cl | 165 |
| CH₃ | Cl | Cl | 118 |
| CCl₃ | Cl | Cl | 195 |

The compounds prepared by our process from 2-methyl-1,1,1,3,3,3-hexafluoro-2-propanol to contain either 1, 2 or 3 chlorines on the 2-methyl carbon are effective per se as fumigants for insects which infest stored products such as grain, including confused flour beetle (*Tribolium confusum*), black carpet beetle (*Attagenus piceus*), and yellow meal worm (*Tenebrio molitor*). These compounds are also effective fumigants against nematodes. On the other hand, the compounds prepared by chlorination of 2-methyl-1,1,3,3-tetrafluoro-1,3-dichloro-2-propanol do not possess fumigant activity.

All the compounds of our invention, however, can be converted into highly fluorinated compounds of superior fumigant activity by fluorination using SbF₅ as the fluorinating agent, in which case every chlorine atom in the molecule is replaced by fluorine, viz.

(1) 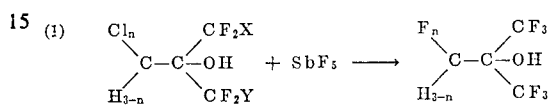

All of the fluorinated compounds thus obtained are highly effective fumigants against insects which infest stored food products such as grain and against nematodes, and are all significantly more toxic than the corresponding chlorinated compounds from which they are prepared.

The compounds prepared according to the process of our invention can also be fluorinated using SbF₃+SbCl₅ together, in which case only chlorines on the 2-methyl carbon are converted to fluorine, and in any case produce fluorinated compounds with no more then two fluorine atoms on the 2-methyl carbon, viz.

(2) 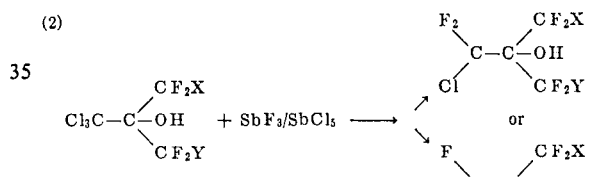

(3) 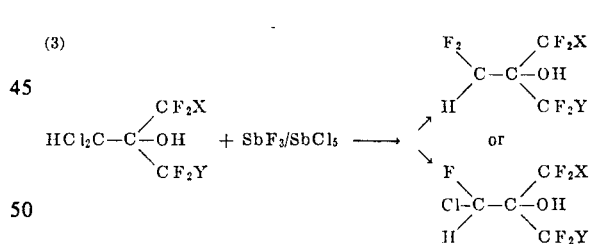

(4) 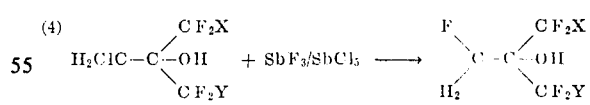

Of the compounds obtained by the above fluorination procedures (equations 2–4), the compound ClF₂C—C(CF₂Cl)₂OH (equation 2), was found to have selective fumigant activity against nematodes and confused flour beetles.

Of especial interest among the compounds which can be prepared according to our new process in 2-trichloromethyl-1,1,1,3,3,3-hexafluoro-2-propanol because of its ready conversion to the corresponding 2-trifluoromethyl-1,1,1,3,3,3-hexafluoro-2-propanol, which we have found has exceptionally high utility as a fumigant for insects which infest stored food products such as grain and also as a fumigant against nematodes, such fumigant activity being exhibited even at extremely low concentrations of the toxicant. This superiority in fumigant activity of the highly fluorinated compound over that of the corresponding 2-trichloromethyl compound is very surprising, as, in general, chlorine substituted compounds have heretofore shown superiority in toxicity to biological pests, over that of their fluorine substituted counterparts.

The 2-chloromethyl- and 2-fluoromethyl-1,3-polyfluoro-2-propanols which we have found to have excellent toxicity in their vapor forms against insects, especially against insects which infest stored products such as grain, have the formula

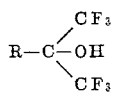

wherein R is a member selected from the group consisting of $-CCl_3$, $-CHCl_2$, $-CH_2Cl$, $-CF_3$, $-CF_2Cl$ and $-CFCl_2$.

Selectively effective against the confused flour beetle and against nematodes is the compound

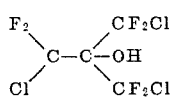

prepared by fluorinating 2-trichloromethyl-1,1,3,3,-tetrafluoro-1,3-dichloro-2-propanol as illustrated in equation 2 herein.

Fumigation with the toxic 2-halomethyl-1,3-polyfluoro-2-propanols is carried out according to conventional fumigation practices by exposing the organism to the vapor of the toxicant. This is usually accomplished by placing a small amount of the liquid toxicant in the space to be fumigated, or by injecting relatively small amounts into the body of the material to be treated, such as grain or the like, and permitting the toxicant to vaporize, thus subjecting the organism to be controlled to the vapors of the toxicant for a period sufficient to rid the space of pests. If desired, the toxicant may be initially applied in vapor form.

The following specific examples further illustrate the invention.

EXAMPLE 1

Vapor phase chlorination of $H_3CC(CF_3)_2OH$

2-Methyl-hexafluoro-2-propanol, b.p. 61° C., in the amount of 150 grams (0.824 mol) was vaporized from a heated flask into the reaction zone of a vapor phase reactor fitted with a quartz mercury vapor lamp (Hanovia 450 W) delivering ultraviolet light of wavelengths in the range between 2,000° A. and 3,6000° A., the lamp being located within a quartz (Vycor) water-cooled well (maintained at about 20° C.). Chlorine gas was fed into the reactor over a period of 21 hours, mixing with the alcohol and under illumination by the ultraviolet light at an average rate of about 10 grams per hour until 205 grams (2.89 mols) of chlorine had been introduced. During introduction of chlorine, the chlorinated product in the vaporous reaction mass, coming in contact with the cool walls of the water-cooled well (20° C.) was condensed and returned to the heated flask. Continued application of heat to the flask produced vaporization of remaining starting alcohol. Byproduct HCl was continuously removed as a vapor from the top of the reaction zone. The temperature rose over the reaction period form 64° to 100° C. The rate of consumption of chlorine at this time had extremely slow. The flask was removed and the resulting crude product was separated by distillation into three fractions identified below

| | |
|---|---|
| 1. b.p. up to 65° C. | 37 g. unreacted CH₃C(CF₃)OH |
| 2. b.p. 65° C. to 135° C. | 15 g. mixture of CH₃C(CF₃)₂OH, ClCH₂C(CF₃)₂OH, Cl₂CHC(CF₃)OH and Cl₃CC(CF₃)OH |
| 3. b.p. 135° to 135° C. | 127 g. product Cl₃CC(CF₃)₂OH, a yield of 72% |

The structure of the product 2-trichloromethyl-1,1,1,3,3,3-hexafluoro-2-propanol (fraction 3) was confirmed first by comparison of its infrared spectrum with that described by Filler and Schure (J. Org. Chem. 32, 1,217 (1967)); second by its conversion to $(F_3C)_3COH$ and third by mass spectral analysis.

EXAMPLE 2

Vapor phase chlorination of $H_3CC(CF_2Cl)_2OH$

In the manner described in example 1 above, 1 mol of 2-methyl-1,1,3,3-tetrafluoro-1,33-dichloro-2-propanol (b.p. 118° C.) was irradiated in the vapor phase in admixture with chlorine gas in the wavelength range of 2,000° A. and 3,600° A., introduction of chlorine gas being continued until virtually no further absorption of chlorine was taking place, a period of about 20-24 hours. The resulting product was distilled and provided a 70 percent yield of 2-trichloromethyl-1,1,3,3-tetrafluoro-1,3-dichloro-2-propanol product of the formula

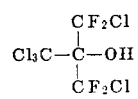

boiling point 108° C. at 33 mm. hg.
Elemental analysis showed

| | C | H | Cl |
|---|---|---|---|
| Calculated | 15.1 | 0.32 | 55.69 |
| Found | 15.38 | 0.46 | 55.95 |

The structure of the product was confirmed by nuclear magnetic resonance examination.

EXAMPLE 3

Vapor phase chlorination of $H_3CC(CF_3)(CF_2Cl)OH$

In the manner described in example 1 above vapors of 2-methyl-1,1,1,3,3-pentafluoro-3-chloro-2-propanol vapor and chlorine gas are reacted under illumination with ultraviolet light of wavelength 2,000-3,600° A. until virtually no further absorption of chlorine occurred. Upon distillation, the mixture yields the product 2-trichloromethyl-1,1,1,3,3-pentafluoro-3-chloro-2-propanol of the formula

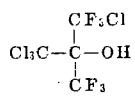

EXAMPLE 4

Liquid phase chlorination of $H_3CC(CF_3)_2OH$ 200 grams of 2-methyl-hexafluoroisopropanol were placed in a 250 ml. quartz flask fitted with a magnetic stirrer, a sintered glass gas inlet and a dry ice reflux condenser. A quartz mercury vapor lamp (Hanovia 450 W) delivering a broadband of ultraviolet light of wavelengths in the range between 3,600° A. and 2,000° A. was placed at one side of the flask at a distance of about 30 mm. from the outside of the flask below the level of the liquid alcohol in the flask. At ambient temperature of about 25° C. chlorine gas was fed through the sintered glass gas inlet for a period of about 2 hours at a rate of about 10 grams per hour while irradiating the reaction mixture with UV light from the lamp. Examination of the reaction mixture by gas-liquid chromatography at this point revealed the presence of considerable monochlorinated product $H_2ClCC(CF_{3cq'})_2OH$ and traces of di- and trichlorinated product. Chlorine feed was continued at the same rate for 5 additional hours, at which time examination by gas-liquid chromatography revealed the presence of substantial proportions of the trichlorinated product $CCl_3C(CF_3)_2OH$ in admixture with smaller proportions of the mono- and dichlorinated products. After an additional 9 hours, GLC examination showed that the crude liquid in the flask consisted entirely of the trichloro product $Cl_3CC(CF_3)_2OH$.

Distillation of the crude product yielded 266.5 grams of pure $Cl_3CC(CF_3)_2OH$, b.p. 136° C., equivalent to a yield of 85.5 percent based on the starting alcohol. In addition 15.5 grams of impure trichloro alcohol was recovered from the fore fraction bringing the yield to approximately 90 percent of theory.

EXAMPLE 5

Liquid phase chlorination of $H_3CC(CF_2Cl)_2OH$

In a quartz Erlenmeyer flask equipped with a magnetic stirrer, a sintered glass gas inlet and dry ice reflux condenser was placed 65.9 grams (0.308 mol) of 1,1-bis(chlorodifluoromethyl) ethanol (b.p. 118° C.). A quartz mercury vapor lamp (Hanovia 450 W) delivering ultraviolet light of wavelengths in the range between 2,000° A. and 3,600° A. was placed at a distance of about 30 mm. from the outside of the flask below the level of the liquid alcohol therein. At ambient temperature chlorine was fed into the liquid alcohol through the sintered glass inlet, while irradiating the liquid by means of the mercury vapor lamp. After 3 hours irradiation, and chlorine introduction, examination of the reaction mass by gas-liquid chromatography showed the presence of mono-, di- and trichloroalcohols. Periodic examinations of the reaction mass during continued irradiation and chlorination showed continued smooth progress of the mixture to the trichlorinated product. After 12½ hours and the absorption of 78 grams of chlorine, the reaction was stopped. The crude product was then distilled and yielded the following fractions.

1. forerun up to 110° C.
2. b.p. 45°/25 mm.-93°/25 mm. 7.9 grams
3. b.p. 93°/25 mm.-96°/25 mm. 70.1 g. pure product
4. residue                    2 grams The 70.1 grams of pure product (fraction 3) is equivalent to a 71.5 percent yield of $CCl_3C(CF_2Cl)_2OH$ based on the starting alcohol consumed.

EXAMPLE 6

Fluorination of $Cl_3CC(CF_3)_2OH$ with $SbF_5$

Antimony pentafluoride (276.5 grams, 1.27 mols) was placed in a 500 ml. flask fitted with a dropping funnel, thermometer, mechanical stirrer, takeoff head, condenser and cooled receiver. Then 118.6 grams (0.415 mol) of 2-trichloromethyl-1,1,1,3,3,3-hexafluoro-2-propanol was added slowly, dropwise with stirring and occasional ice bath cooling to maintain the flask temperature at about 35°–40° C. After all the alcohol had been added, the resulting pale, yellow green solution was stirred at ambient temperature (ca. 25° C.) then warmed gently with an oil bath held at 60°–65° C. The fluorinated product distilled from the flask between 40° and 48° C. and was collected in the cooled receiver. When no more distillation was apparent, the temperature of the oil bath was raised to 80°–85° C., then to 105°–110° C., and at each stage more product was collected. The temperature was finally raised to 150° C. but very little further product distilled at this temperature. The final distillate weighed 90.2 grams and was found by gas-liquid chromatography examination to be pure tri(trifluoromethyl) carbinol $(F_3C)_3COH$, representing a yield of 92 percent based on the chlorinated reactant.

EXAMPLE 7

Fluorination of $Cl_3CC(CF_3)_2OH$ with $SbF_3/SbCl_5$

Antimony trifluoride (71.5 grams, 0.4 mol) and antimony pentachloride (10 ml.) were mixed in a 250 ml., three-necked flask equipped with a stirrer, a reflux condenser, a thermometer and a dropping funnel. Then, at ambient temperature ca. 25° C.) and with stirring, trichloromethyl-1,1,1,3,3,3-hexafluoro-2-propanol (38 grams, 0.113 mol) was added slowly. The resultant slurry was heated until a steady reflux was obtained (100°–105° C.) and this condition was maintained with vigorous stirring for 30 minutes. The mixture was then cooled to about 30° C. and then distilled to remove the resulting fluorinated products by distillation. The crude product was redistilled through a spinning band column and yielded 3 grams of $ClF_2CC(CF_3)_2OH$, b.p. 72° C. and 19.9 grams of $Cl_2FCC(CF_3)_2OH$, b.p. 103–104° C. The structure of the major product $Cl_2FCC(CF_3)_2OH$ was confirmed by infrared and nuclear magnetic resonance spectroscopy and by elemental analysis, the latter shown below.

|            | Percent C | Percent H | Percent Cl |
|------------|-----------|-----------|------------|
| Calculated | 17.99     | 0.38      | 26.56      |
| Found      | 17.72     | 0.38      | 26.47      |

Structure of the minor product was confirmed by comparing its properties to those reported by Filler and Schure.

EXAMPLE 8

The chlorinated compounds prepared according to our invention, as well as their corresponding fluorinated derivatives, were tested for their fumigant activity against insects which infest stored food products such as grain including confused flour beetle (*Tribolium confusum*), black carpet beetle larvae (*Attagenus piceus*) and yellow meal worm larvae (*Tenebrio molitor*). Toxic action against nematodes is also shown in some cases.

In carrying out the fumigant tests, ten insects of each species are placed in 1.5-inch diameter salve tins with perforated lids. A small amount of appropriate food is placed in each tin. The tins are placed in gallon jars and the appropriate dosages of toxicant to provide a vapor concentration of toxicant of about 8 ounces per 1,000 cubic feet or less, are placed on cellucotton wads in the jars which are then sealed. After 24 hours exposure, insect containers are removed from the jars and mortality counts are made 5 days after the start of the test.

Results are shown in table II below in comparison with similar tests made using the unchlorinated starting material and tests using no toxicant.

TABLE II

| Compound | Dose, oz./1,000 ft.³ | Percent kill against*— | | | |
|---|---|---|---|---|---|
| | | CFB | BCB | YMW | NEM |
| $CH_3C(CF_3)_2OH$ | 8 | 80 | 40 | 40 | <5 |
| | 4 | 40 | 0 | 0 | <5 |
| $CH_2ClC(CF_3)_2OH$ | 8 | 100 | 100 | 100 | 95 |
| | 4 | 100 | 40 | 60 | 10 |
| $CHCl_2C(CF_3)_2OH$ | 8 | 100 | 100 | 100 | 100 |
| | 4 | 100 | 100 | 100 | 98 |
| | 2 | 0 | 0 | 0 | <5 |
| | 1 | 0 | 0 | 0 | <5 |
| $CCl_3C(CF_3)_2OH$ | 8 | 100 | 100 | 100 | 100 |
| | 4 | 100 | 100 | 100 | 100 |
| | 2 | 0 | 0 | 0 | <10 |
| | 1 | 0 | 0 | 0 | <5 |
| $CFCl_2C(CF_3)_2OH$ | 8 | 100 | 100 | 100 | 90 |
| | 4 | 100 | 40 | 20 | 85 |
| | 2 | 40 | 20 | 0 | 15 |
| $CF_2ClC(CF_3)OH$ | 8 | 100 | 100 | 100 | 100 |
| | 4 | 100 | 100 | 100 | 100 |
| | 2 | 100 | 80 | 60 | 25 |
| | 1 | 100 | 20 | 0 | 5 |
| $CF_3C(CF_3)_2OH$ | 8 | 100 | 100 | 100 | 100 |
| | 4 | 100 | 100 | 100 | 45 |
| | 2 | 100 | 100 | 100 | <10 |
| | 1 | 20 | 0 | 20 | <5 |
| $CClF_2C(CF_2Cl)_2OH$ | 8 | 100 | 0 | 0 | 100 |
| | 4 | 100 | 0 | 0 | 100 |
| $CH_3C(CF_2Cl)_2OH$ | 16 | 100 | 0 | 80 | 100 |
| $CCl_3C(CF_2Cl)_2OH$ | | 0 | 0 | 0 | <10 |
| $CCl_2HC(CF_2Cl)_2OH$ | | 0 | 0 | 0 | <10 |
| No toxicant | | 0 | 0 | 0 | 0 |

* CFB = confused flour beetle
BCB = black carpet beetle larvae
YMW = yellow mealworm larvae
NEM = nematodes

We claim:

1. The process for preparing 2-chloromethyl-1,3-polyfluoro-2-propanols of the formula

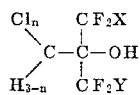

wherein $n$ is an integer from 1 to 3 inclusive, X and Y are the same or different members selected from the group consisting of fluorine and chlorine, which comprises preparing a mixture of chlorine and a 2-methyl-1,3-polyfluoro-2-propanol of the formula

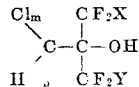

wherein $m$ is an integer from 0 to 2 inclusive and X and Y are as defined above and irradiating said mixture with a broadband of ultraviolet light in the wavelength range between about 2,000° A. and about 3,600° A. at a temperature between about 10° C. and about 200° C.

2. The process according to claim 1 wherein the mixture irradiated is in the liquid phase.

3. The process according to claim 1 wherein the mixture irradiated is in the vapor phase.

4. The process according to claim 1 wherein the 2-methyl-1,3-polyfluoro-2-propanol is 2-methyl-1,1,1,3,3,3-hexafluoro-2-propanol of the formula

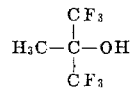

5. The process according to claim 1 wherein the 2-methyl-1,3-polyfluoro-2-propanol is 2-methyl-1,1,3,3-tetrafluoro-1,3-dichloro-2-propanol of the formula

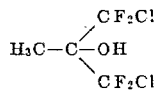

6. The process according to claim 1 wherein the 2-methyl-1,3-polyfluoro-2-propanol is 2-methyl-1,1,1,3,-pentafluoro-3-chloro-2-propanol of the formula

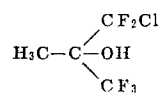

UNITED STATES PATENT OFFICE
CERTIFICATE OF CORRECTION

Patent No. 3,616,360　　　　　　　　　Dated October 26, 1971

Inventor(s) Robert E. A. Dear et al.

It is certified that error appears in the above-identified patent and that said Letters Patent are hereby corrected as shown below:

Column 1, line 52, "2-methyl-1,1,1,3-3-" should read -- 2-methyl-1,1,3,3- --; line 62, "polyfluoru" should read -- polyfluoro --. Column 3, line 23, "our" should read -- out --; line 64, cancel "Byproducts". Column 4, line 26, "13" should read -- 12 --. Column 8, line 12, "tetrafluoro-1,33-" should read -- tetrafluoro-1,3- --. Column 9, line 66, "Cott" should read -- COH --. Claim 1, column 11, second formula

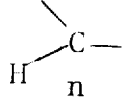　　　　should read　　　　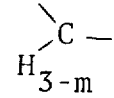

Claim 6, line 22, "2-methyl-1,1,1,3-" should read -- 2-methyl-1,1,1,3,3 --.

Signed and sealed this 6th day of June 1972.

(SEAL)
Attest:

EDWARD M. FLETCHER, JR.　　　　　　　ROBERT GOTTSCHALK
Attesting Officer　　　　　　　　　　Commissioner of Patents